US011856942B2

(12) United States Patent
Crenshaw

(10) Patent No.: US 11,856,942 B2
(45) Date of Patent: *Jan. 2, 2024

(54) DUAL NOZZLE SPRAYER

(71) Applicant: Kenneth D. Crenshaw, Bartlett, TN (US)

(72) Inventor: Kenneth D. Crenshaw, Bartlett, TN (US)

(*) Notice: Subject to any disclaimer, the term of this patent is extended or adjusted under 35 U.S.C. 154(b) by 170 days.

This patent is subject to a terminal disclaimer.

(21) Appl. No.: 17/215,593

(22) Filed: Mar. 29, 2021

(65) Prior Publication Data

US 2021/0212309 A1 Jul. 15, 2021

Related U.S. Application Data

(63) Continuation of application No. 15/729,062, filed on Oct. 10, 2017, now Pat. No. 10,973,219, which is a
(Continued)

(51) Int. Cl.
*A01M 7/00* (2006.01)
*B05B 9/01* (2006.01)
(Continued)

(52) U.S. Cl.
CPC ......... *A01M 7/0046* (2013.01); *B05B 1/1609* (2013.01); *B05B 1/1636* (2013.01);
(Continued)

(58) Field of Classification Search
None
See application file for complete search history.

(56) References Cited

U.S. PATENT DOCUMENTS

| 1,331,465 A | 2/1920 | Barrett |
| 2,462,262 A | 2/1949 | Gustafsson et al. |
| (Continued) |

FOREIGN PATENT DOCUMENTS

| EP | 1930083 A2 | 6/2008 |
| JP | 2013066823 A | 4/2013 |
| (Continued) |

OTHER PUBLICATIONS

Canada Intellectual Property Office: Office Action for corresponding Canadian Patent Application No. 3,012,687 dated Oct. 11, 2019, 3 pages.
(Continued)

*Primary Examiner* — Tuongminh N Pham
(74) *Attorney, Agent, or Firm* — Bradley Arant Boult Cummings; Alex H. Huffstutter

(57) ABSTRACT

A fluid spray apparatus includes at least one inlet and first and second outlets. A first actuator may communicate a first inlet with one of the outlets. A second actuator also may communicate a second inlet with a different one of the outlets. A passage network of the fluid spray apparatus communicates the first and second actuators with the first and second outlets. A diverter structure is disposed in the passage network. The diverter structure includes a first diverter structure arrangement. In the first diverter structure arrangement, the first actuator communicates the first inlet with the first outlet and the second actuator communicates the second inlet with the second outlet. The diverter structure also includes a second diverter structure arrangement. In the second diverter structure arrangement, the first actuator communicates the first inlet with the second outlet and the second actuator communicates the second inlet with the first outlet.

19 Claims, 20 Drawing Sheets

Related U.S. Application Data continuation of application No. 15/042,360, filed on Feb. 12, 2016, now Pat. No. 9,814,227.

(51) Int. Cl.
  *B05B 12/00* (2018.01)
  *B05B 1/16* (2006.01)
  *B05B 1/30* (2006.01)

(52) U.S. Cl.
  CPC .............. *B05B 1/3013* (2013.01); *B05B 9/01* (2013.01); *B05B 12/002* (2013.01)

(56) References Cited

U.S. PATENT DOCUMENTS

| | | | |
|---|---|---|---|
| 2,726,898 A | 12/1955 | Henriksson | |
| D183,070 S | 6/1958 | Stillson | |
| 2,969,926 A | 1/1961 | Peeps | |
| 3,511,951 A | 5/1970 | Miller | |
| 4,005,824 A * | 2/1977 | Becker | B05B 7/1209 |
| | | | 239/289 |
| 4,915,304 A | 4/1990 | Campani | |
| 5,221,026 A * | 6/1993 | Williams | B05B 7/24 |
| | | | 222/401 |
| 5,236,129 A | 8/1993 | Grime et al. | |
| 5,979,800 A | 11/1999 | Takagi | |
| 6,042,029 A | 3/2000 | Massey | |
| 6,595,440 B2 | 7/2003 | Moriarty et al. | |
| 6,685,107 B1 * | 2/2004 | Salzman | B05B 7/244 |
| | | | 239/526 |
| 7,568,636 B2 | 8/2009 | Saunders et al. | |
| 9,814,227 B2 | 11/2017 | Crenshaw | |
| 2002/0158143 A1 | 10/2002 | Moriarty et al. | |
| 2004/0227014 A1 | 11/2004 | Williams et al. | |
| 2005/0217652 A1 * | 10/2005 | Styles | F41B 11/68 |
| | | | 124/32 |
| 2006/0272628 A1 | 12/2006 | Styles | |
| 2007/0194148 A1 * | 8/2007 | Rosko | B05B 1/3402 |
| | | | 239/526 |
| 2011/0121105 A1 | 5/2011 | Moriarty et al. | |
| 2012/0043364 A1 | 2/2012 | Coleman, Jr. | |
| 2014/0042238 A1 | 2/2014 | Mather et al. | |
| 2014/0217120 A1 | 8/2014 | Berry | |
| 2014/0239094 A1 | 8/2014 | Munro | |
| 2018/0027798 A1 | 2/2018 | Crenshaw | |

FOREIGN PATENT DOCUMENTS

| | | |
|---|---|---|
| KR | 101502743 B1 | 3/2015 |
| WO | 2005018814 A2 | 3/2005 |
| WO | 2017139135 A1 | 8/2017 |

OTHER PUBLICATIONS

European Patent Office: Extended European search report for corresponding European Application No. 17750579.9 dated Sep. 2, 2019, 8 pages.

* cited by examiner

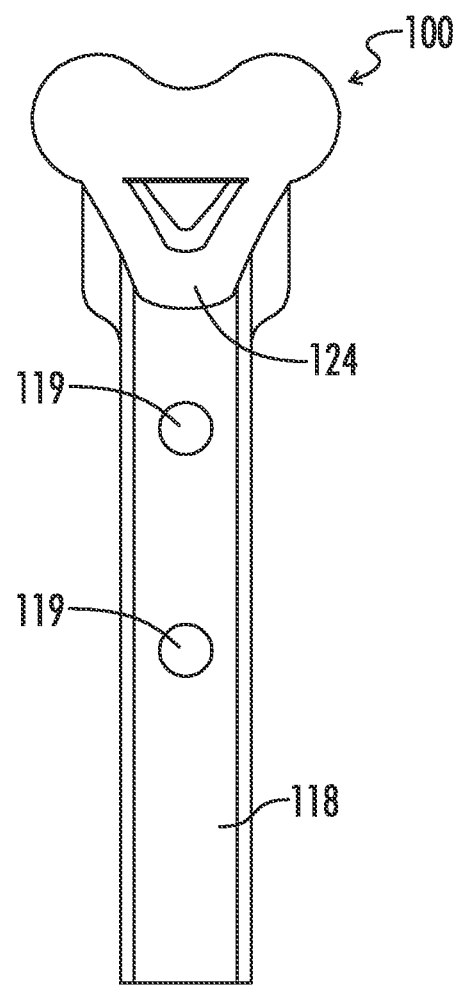
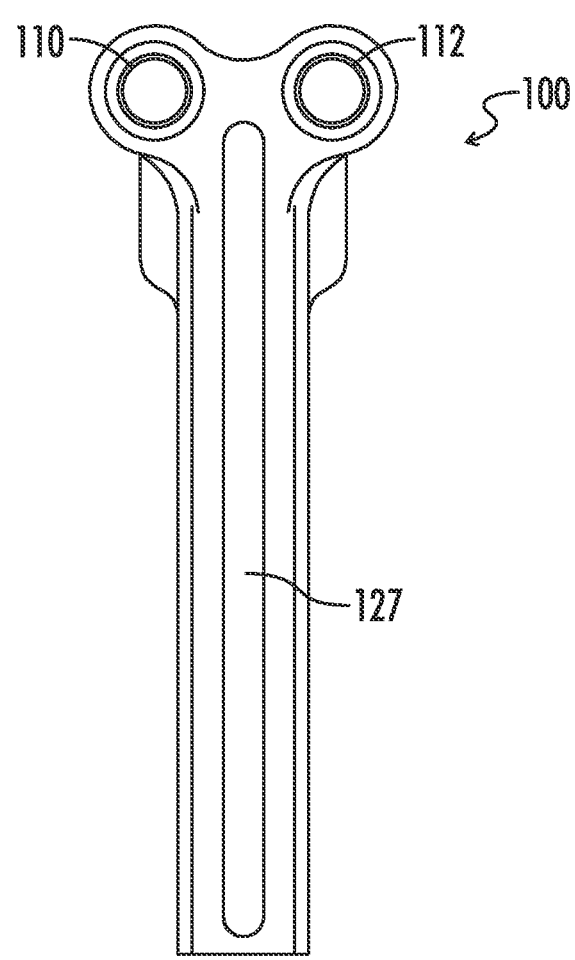
FIG. 3
FIG. 4

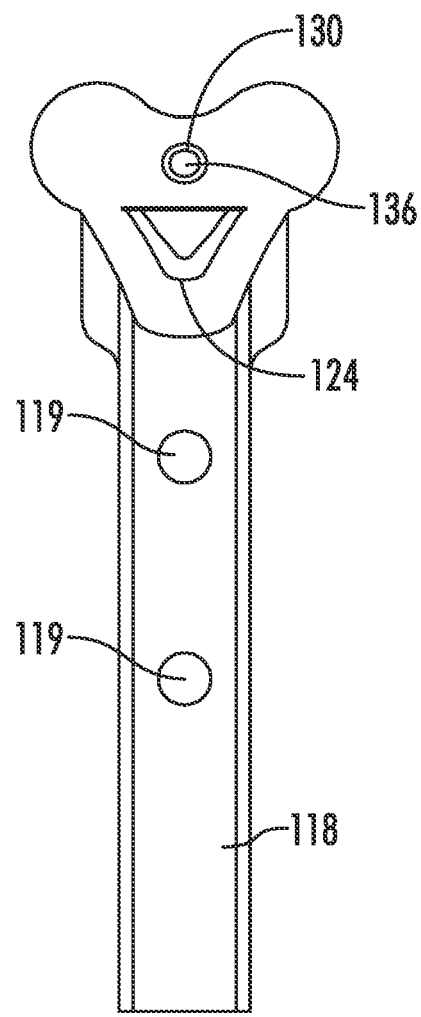 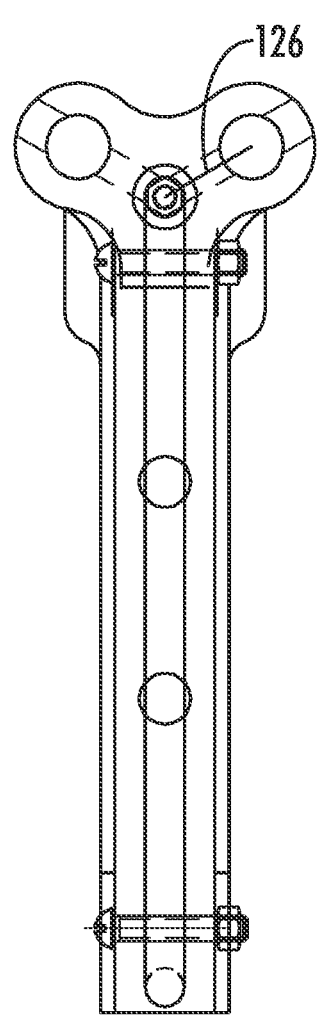
*FIG. 15*   *FIG. 16*
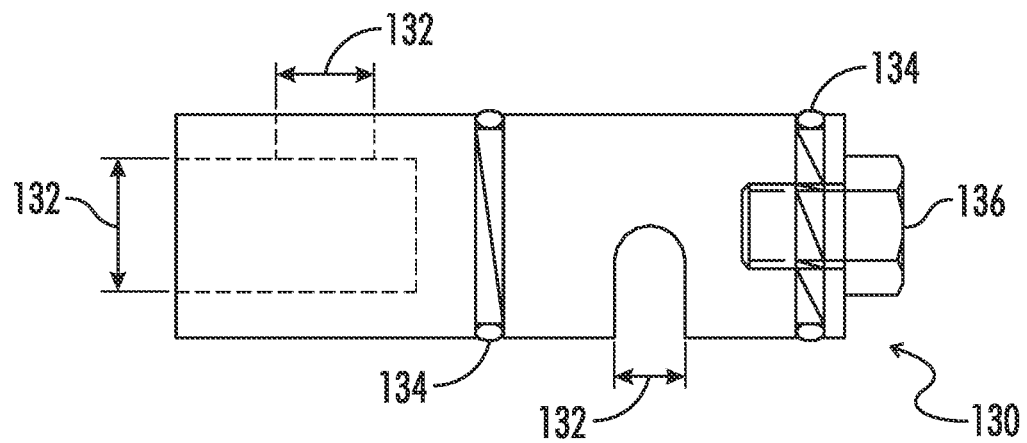
*FIG. 17*

DUAL NOZZLE SPRAYER

CROSS-REFERENCE TO RELATED APPLICATIONS

The present application is a continuation-in-part of and claims priority to and benefit from the following patent applications each of which are hereby incorporated by reference in its entirety: U.S. Non-Provisional patent application Ser. No. 15/729,062 filed Oct. 10, 2017, entitled "Dual Nozzle Spray Gun," which is a divisional of U.S. Non-Provisional patent application Ser. No. 15/042,360 filed Feb. 12, 2016, entitled "Dual Nozzle Spray Gun" (now issued as U.S. Pat. No. 9,814,227 on Nov. 13, 2017).

BACKGROUND

The present disclosure relates generally to a fluid spray apparatus. More particularly, the present disclosure pertains to a fluid spray gun including multiple inlets and outlets.

Fluid spray guns are known in the art. In herbicide applications, spray guns with adjustable nozzles designed to be twisted back and forth by a user are available. A user may wish to apply herbicide to a nearby target with a fan-type pattern and to a distant target with a straight stream pattern that will break up into smaller droplets near the target. To adjust the nozzle to either setting, the user must remove his or her hand from the backpack pumping lever to twist the adjustable nozzle. This method also requires the user to make contact with parts covered in the herbicide. Furthermore, the method can become tiresome to a user, prompting the user to leave the nozzle on the straight stream pattern. If left on the straight stream pattern, the spray will over-penetrate the nearby targets and cause poor performance, environmental problems, and wasted herbicide.

BRIEF SUMMARY

Some embodiments of the current disclosure may allow for spraying different patterns using only one hand, transitioning from one pattern to another quickly and easily, and optionally reversing the actuator-output relationship. In certain additional embodiments, the current disclosure may allow for spraying different fluids using only one hand, transitioning from one fluid to another quickly and easily, and optionally reversing the actuator-output relationship. In still further embodiments, each fluid may have a different pattern.

Briefly, the present disclosure relates, in one embodiment, to a fluid spray apparatus. The fluid spray apparatus includes first and second inlets and first and second outlets. The fluid spray apparatus further includes a first actuator. The first actuator is configured to communicate the first inlet with one of the first or second outlets. The fluid spray apparatus also includes a second actuator. The second actuator is also configured to communicate the second inlet with a different one of the first or second outlets.

In certain embodiments, a passage network of the fluid spray apparatus communicates the first and second actuators with the first and second outlets. A diverter structure is disposed in the passage network. The diverter structure includes a first diverter structure arrangement. In the first diverter structure arrangement, the first actuator communicates the first inlet with the first outlet and the second actuator communicates the second inlet with the second outlet. The diverter structure also includes a second diverter structure arrangement. In the second diverter structure arrangement, the first actuator communicates the first inlet with the second outlet and the second actuator communicates the second inlet with the first outlet.

In an alternative embodiment, the diverter structure includes a plurality of plugs removably disposed in one of a plurality of positions blocking a portion of the passage network.

In still another embodiment, the diverter structure includes a selector valve.

In yet another embodiment, the first diverter structure arrangement and the second diverter structure arrangement are mutually exclusive.

In another embodiment, the first outlet and the second outlet are each configured to receive a variety of fluid spray nozzles.

In a further embodiment, the first outlet includes a diffuse spray nozzle and the second outlet includes a solid stream nozzle.

In a further still embodiment, at least one of the first outlet and the second outlet includes an adjustable spray nozzle.

In another embodiment, the second actuator is coupled to the different one of the first or second outlets using an exterior tube positioned forward of the first and second actuators.

Yet another embodiment includes a handle, and the first and second actuators are hingedly and opposingly disposed on the handle.

In still another embodiment, the first and second actuators at least partially surround a front side of the handle.

In a further embodiment, the first actuator is hingedly coupled to the handle closer to the first and second outlets than to the first and second inlets, and the second actuator is hingedly coupled to the handle closer to the first and second inlets than to the first and second outlets.

Yet another embodiment includes a handle, and the first and second actuators are coupled to and at least partially surround an exterior of the handle.

The present disclosure also relates, in one embodiment, to a fluid spray apparatus including at least one inlet, a first outlet, and a second outlet. A first actuator is configured to communicate the at least one inlet with one of the first or second outlets. A second actuator is configured to communicate the at least one inlet with a different one of the first or second outlets.

In another embodiment, the at least one inlet includes a first inlet and a second inlet.

In one embodiment, the second actuator is coupled to the different one of the first or second outlets using an exterior tube positioned forward of the first and second actuators.

Yet another embodiment includes a handle, and the first and second actuators are coupled to and at least partially surround an exterior front side of the handle.

In a further embodiment, an exterior tube of the fluid spray apparatus is configured to couple the at least one inlet to one of the first or second outlets using the second actuator. The exterior tube may extend from a same side of the handle as the first and second actuators.

In a further still embodiment, the first actuator includes a first trigger and the second actuator includes a second trigger. The first and second triggers may be configured to be aligned with each other and opposed to each other.

In an even further embodiment, each of the first and second actuators is further configured to prevent communication between the at least one inlet and the first and second outlets when the actuators are unactuated.

BRIEF DESCRIPTION OF THE DRAWINGS

FIG. 3 is a rear view of the fluid spray apparatus of FIG. 1.

FIG. 4 is a front view of the fluid spray apparatus of FIG. 1 with the actuators removed.

FIG. 15 is a rear view of one embodiment of the fluid spray apparatus.

FIG. 16 is a front cross-sectional view of the fluid spray apparatus of FIG. 15.

FIG. 17 is a side view of a selector valve of the fluid spray apparatus of FIG. 15.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected" and "attached" should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 2:
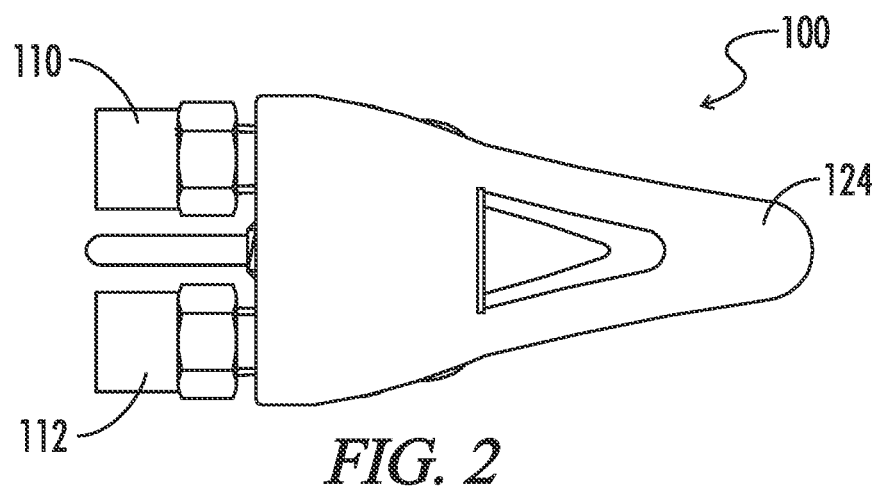
FIG. 2 is a top view of the fluid spray apparatus of FIG. 1.
Figure 1:
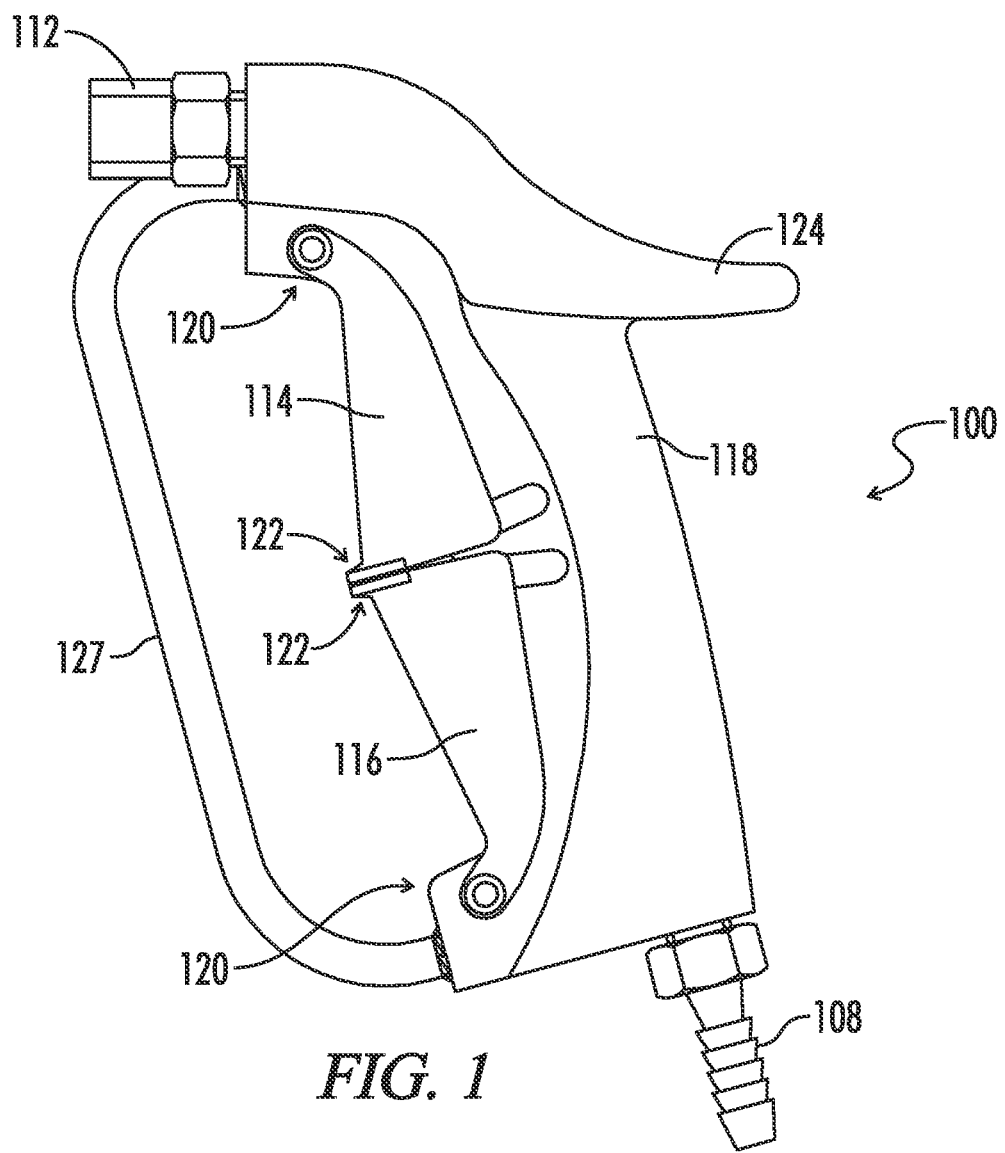
FIG. 1 is a side view of one embodiment of the fluid spray apparatus.
Figure 5:
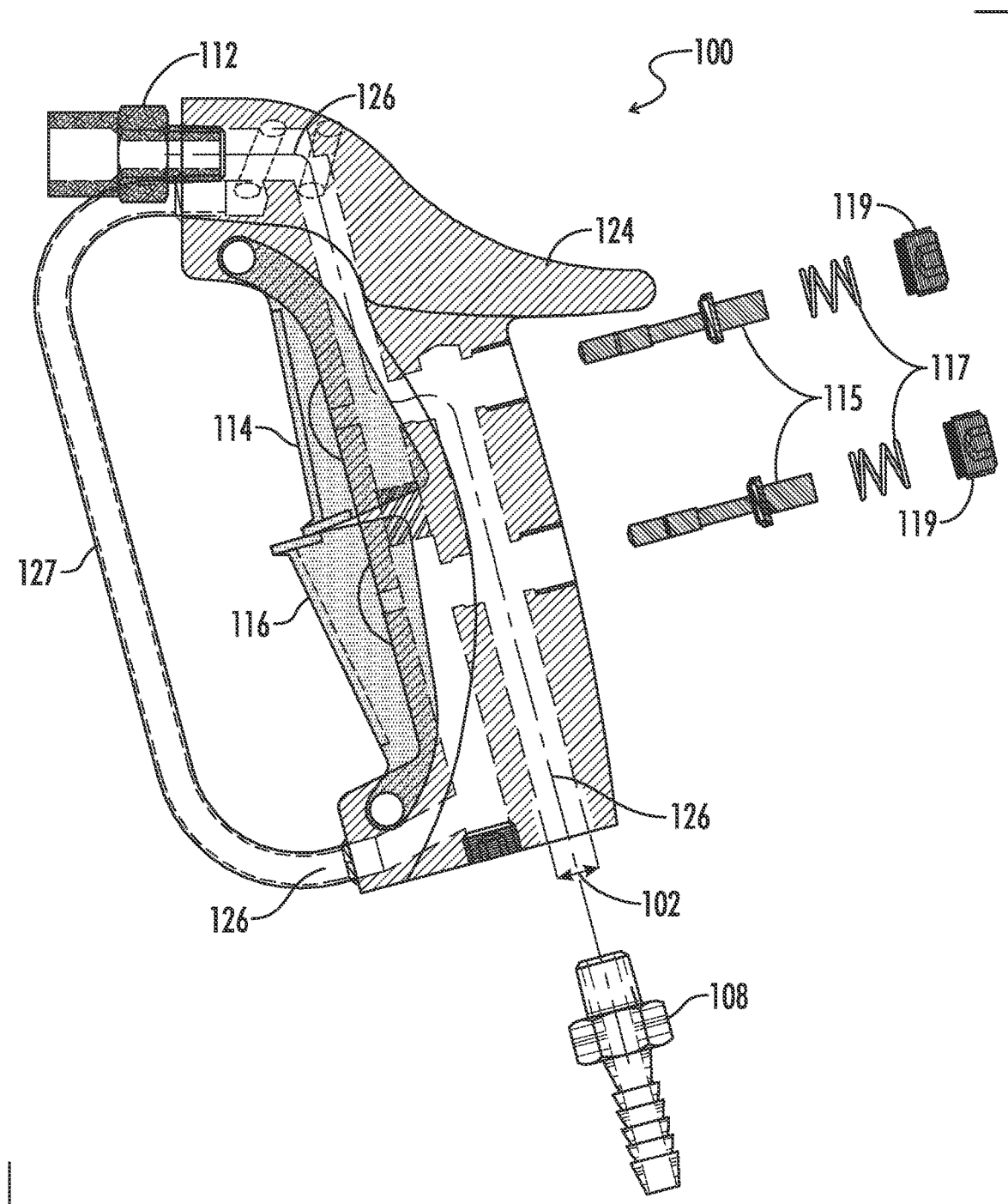
FIG. 5 is a side cross-sectional partially exploded view of the fluid spray apparatus of FIG. 1.
Figure 6:
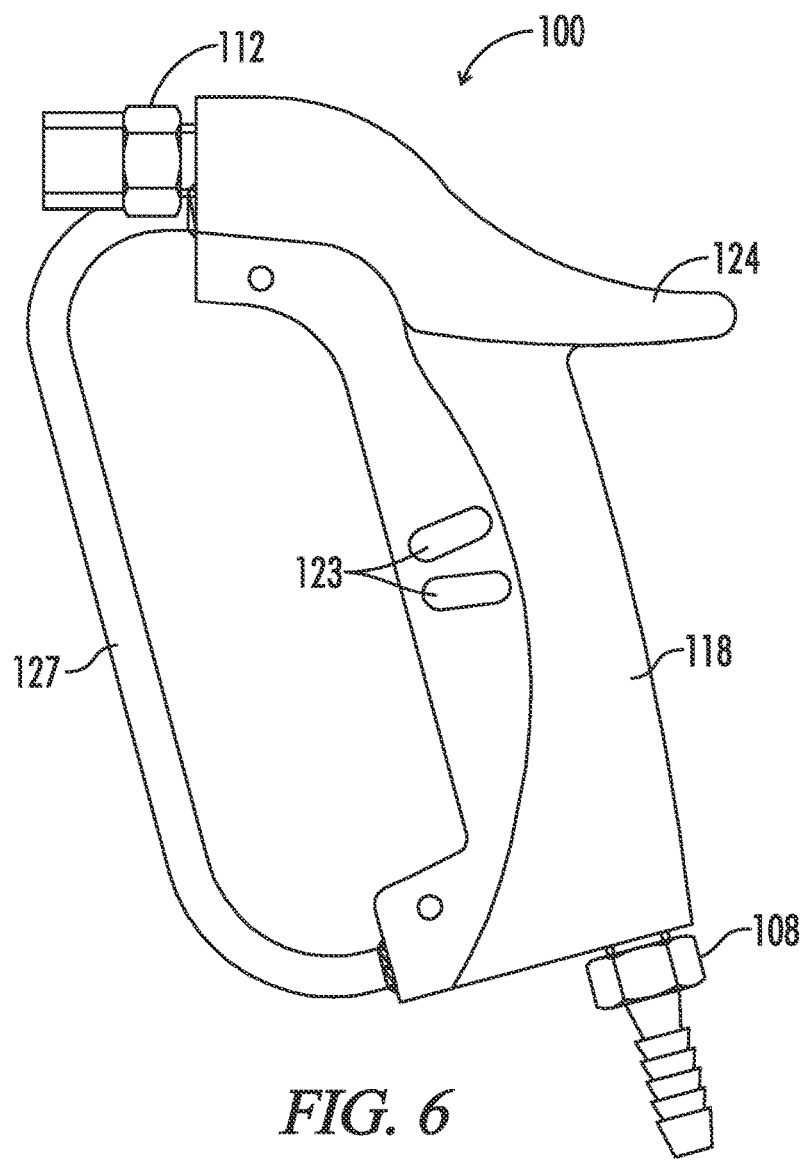
FIG. 6 is a side view of the fluid spray apparatus of FIG. 1 with the actuators removed.
Figure 7:
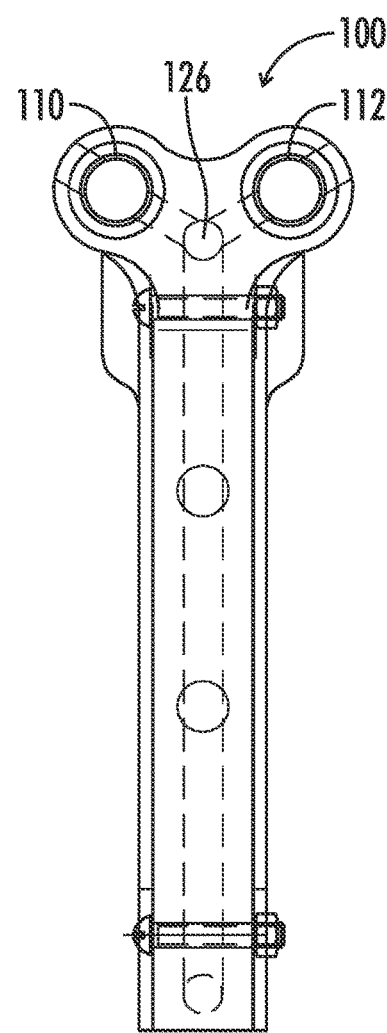
FIG. 7 is a front cross-sectional view of the fluid spray apparatus of FIG. 1.
Figure 8:
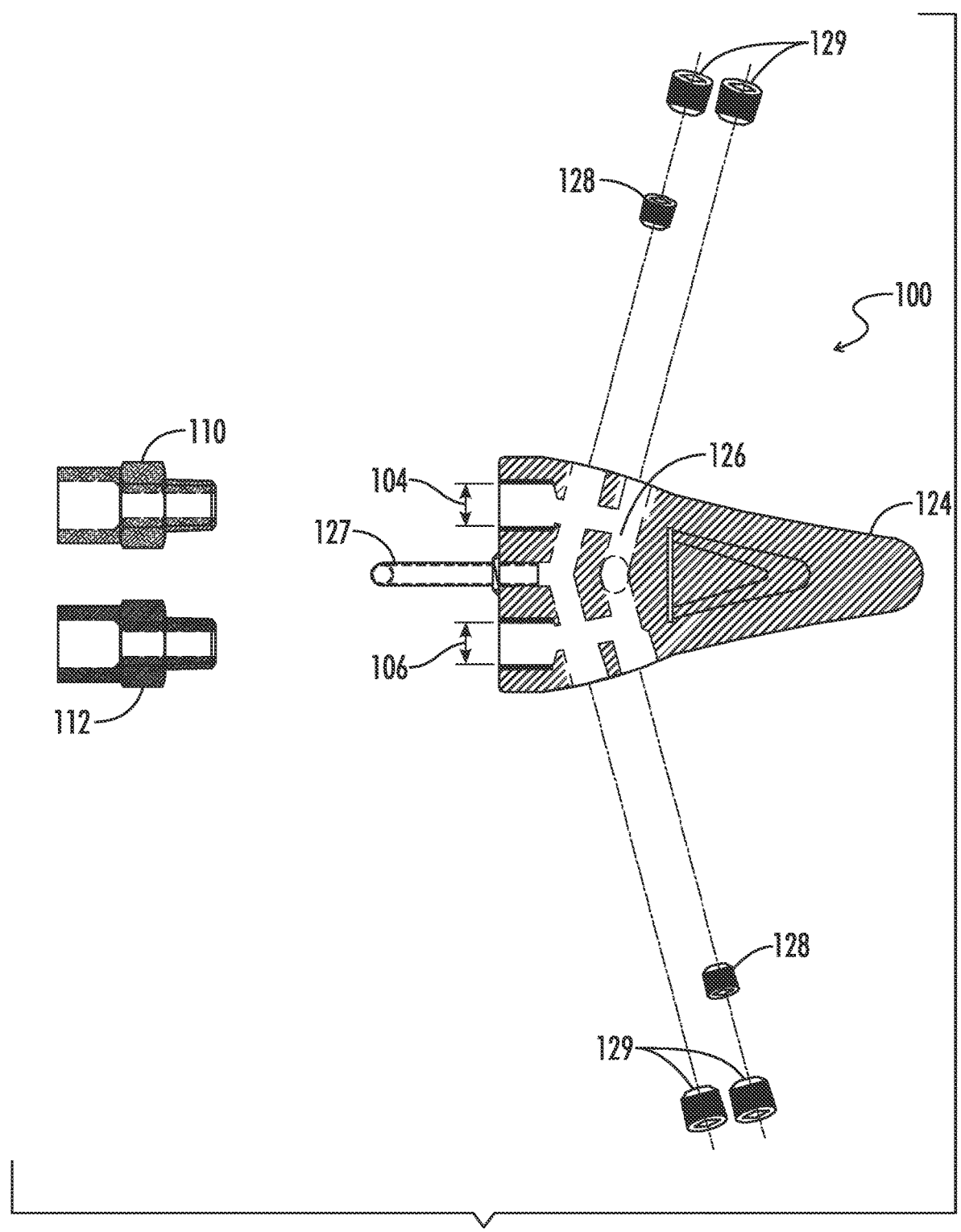
FIG. 8 is a top cross-sectional partially exploded view of the fluid spray apparatus of FIG. 1.

Referring to the Figures, one embodiment of a fluid spray apparatus, or spray gun, 100 is shown. As can best be seen in FIG. 5, the spray gun 100 includes an inlet 102, a first outlet 104, and a second outlet 106. The spray gun 100 optionally includes a hose attachment barb 108 on the inlet 102. The inlet 102 could alternatively include a quick-release connector, a threaded male or female coupler, and the like. The spray gun 100 may also include a first nozzle 110 disposed on the first outlet 104 and a second nozzle 112 disposed on the second outlet 106. Both first nozzle 110 and second nozzle 112 may be permanently connected or removably connected to the spray gun 100. The first and second nozzles 110, 112 may include commonly available standard spray tips that are threadedly received in the first and second outlets 104, 106 respectively. In other embodiments, the nozzles 110, 112 are retained in the outlets 104, 106 with quick-release, snap-on, latching, or other releasable attachment configurations. First nozzle 110 and second nozzle 112 may be of varying spray patterns such that the spray gun 100 may operate with any of a plurality of spray patterns. One embodiment of the spray gun 100 includes the first outlet 104 including a diffuse spray nozzle and the second outlet 106 including a solid stream nozzle. Another embodiment of the spray gun 100 includes at least one of the first outlet 104 and second outlet 106 including an adjustable spray nozzle.

In an embodiment, a first actuator 114 is configured to communicate the inlet 102 with at least one of the outlets 104, 106 such that communication is prevented when the first actuator is unactuated. A second actuator 116 is also configured to communicate the inlet 102 with at least one of the outlets 104, 106 such that communication is prevented when the second actuator is unactuated. Each actuator 114, 116 may actuate valves 115 that are normally biased toward the closed position by springs 117. Each valve 115 may be accessible for replacement or repair by removing a spring retainer plug 119 with common tools, including, but not limited to, a hex key. The actuators 114, 116 may be hingedly connected to the handle 118 such that the actuators include triggers. In some embodiments, the handle 118 may be a pistol grip handle. The actuators 114, 116 may be aligned with each other and opposingly disposed on the handle 118. The actuators 114, 116 may be configured such that the first actuator 114 may be actuated with the index finger and middle finger of a user and the second actuator 116 may be actuated with the ring finger and little finger of the user. Each actuator 114, 116 may include a hinge end 120 and a free end 122. The free ends 122 of the actuators 114, 116 may be nearer each other than the hinge ends 120.

The handle 118 of the spray apparatus may, in some embodiments, include guide channels 123 configured to receive a portion of a respective trigger/actuator 114, 116. The guide channels 123, in conjunction with the curved free ends 122 of the triggers 114, 116, may prevent pinching a user's fingers when one or more of the triggers are actuated. In at least one embodiment, the trigger free ends 122 remain in contact with each other during actuation. The channels 123 also may function to prevent over-actuation of the actuators 114, 116. The channels 123 may further function to hold the actuators in close readiness to the valve assembly.

In some embodiments, the handle 118 is angled from the spray direction of the nozzles 110, 112 such that the handle and the spray direction of the nozzles forms an angle of between 90 and 180 degrees. More specifically, the handle 118 and the spray direction of the nozzles 110, 112 form an angle of between 90 and 120 degrees. Even more specifically, the handle 118 and the spray direction of the nozzles 110, 112 form an angle of 105 degrees. These angles may be desirable to allow for ergonomic and comfortable use for a user's wrist when holding the spray apparatus 100. Furthermore, the spray apparatus 100 may include a flat or contoured protrusion 124 extending from the handle. The protrusion 124 may be configured such that a user's hand between the thumb and index finger may rest against the protrusion to aid in supporting the weight of the spray apparatus 100. Another ergonomic feature optionally included in the spray apparatus 100 is the location of the inlet 102 at the bottom of the handle 118. This location allows for any hose attached to the hose attachment barb 108 to extend below the wrist of a user so the hose does not get in the way of the user's arm and so the weight of the hose and the spray gun 100 may be close to the user's hand.

Some embodiments of the fluid spray apparatus 100 may include a passage network 126 including multiple paths connecting the inlet 102 with the first outlet 104 and second outlet 106. The paths may be, but are not limited to, one or more paths defined in the handle 118 of the spray apparatus 100, one or more tubes 127 exterior to the handle of the spray apparatus, and the like.

In one embodiment of the fluid spray apparatus 100, a diverter structure including a plurality of plugs 128 may be removably disposed in one of a plurality of positions blocking a portion of the passage network 126. Threaded covers 129 may be removed with common tools including, but not limited to, a hex key to access the plugs 128 or to clean the passage network 126. The plurality of positions may form a first diverter structure arrangement and a second diverter structure arrangement. In some embodiments, the first diverter structure arrangement and the second diverter structure arrangement may be mutually exclusive.

Figure 9:
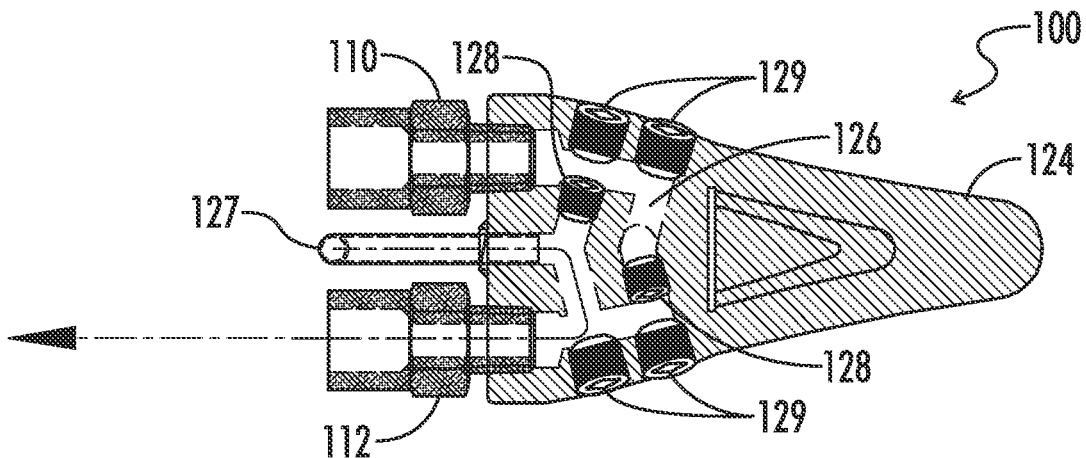
FIG. 9 is a top cross-sectional view of the fluid spray apparatus of FIG. 1 with the diverter structure in a first arrangement and the bottom actuator actuated.
Figure 12:
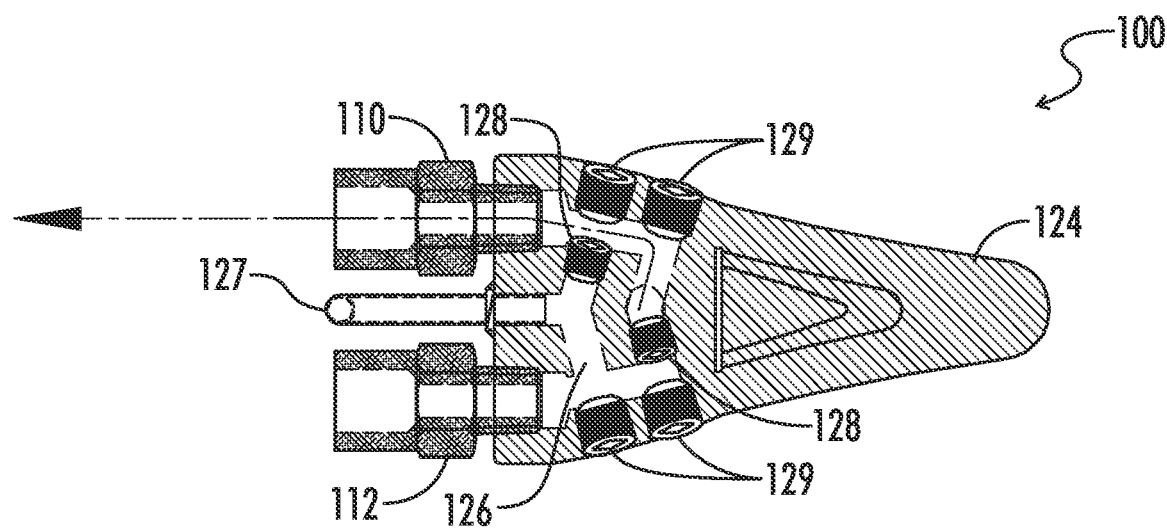
FIG. 12 is a top cross-sectional view of the fluid spray apparatus of FIG. 1 with the diverter structure in a first arrangement and the top actuator actuated.

As shown in FIGS. 9 and 12, the plurality of plugs 128 may be placed in a first diverter structure arrangement wherein the first actuator 114 may communicate the inlet 102 with the first outlet 104 and the second actuator 116 may communicate the inlet with the second outlet 106. In embodiments including the hose attachment barb 108 and the first and second nozzles 110, 112, the first actuator 114 may communicate the opening of the hose attachment barb with the opening of the first nozzle and the second actuator 116 may communicate the opening of the hose attachment barb with the opening of the second nozzle.

Figure 10:
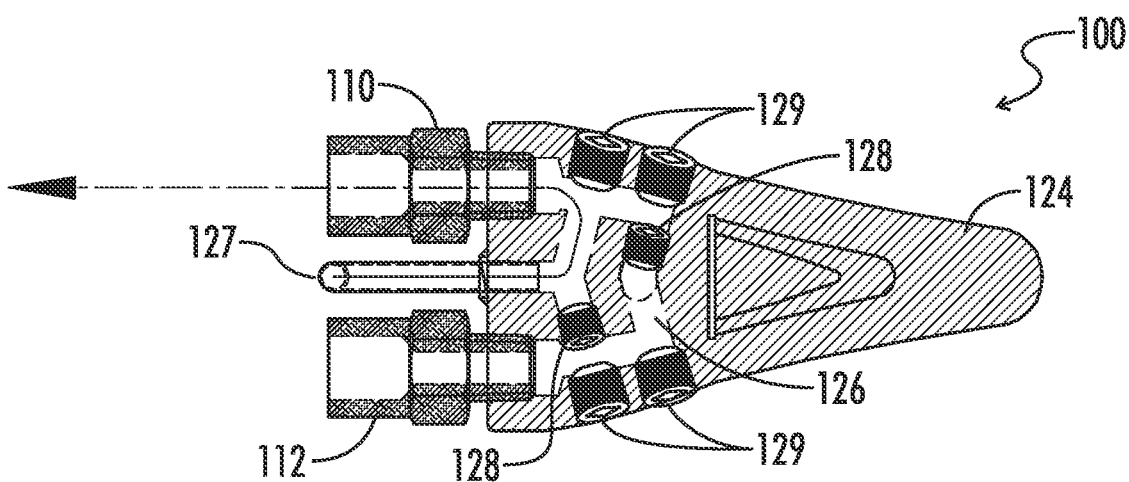
FIG. 10 is a top cross-sectional view of the fluid spray apparatus of FIG. 1 with the diverter structure in a second arrangement and the bottom actuator actuated.
Figure 11:
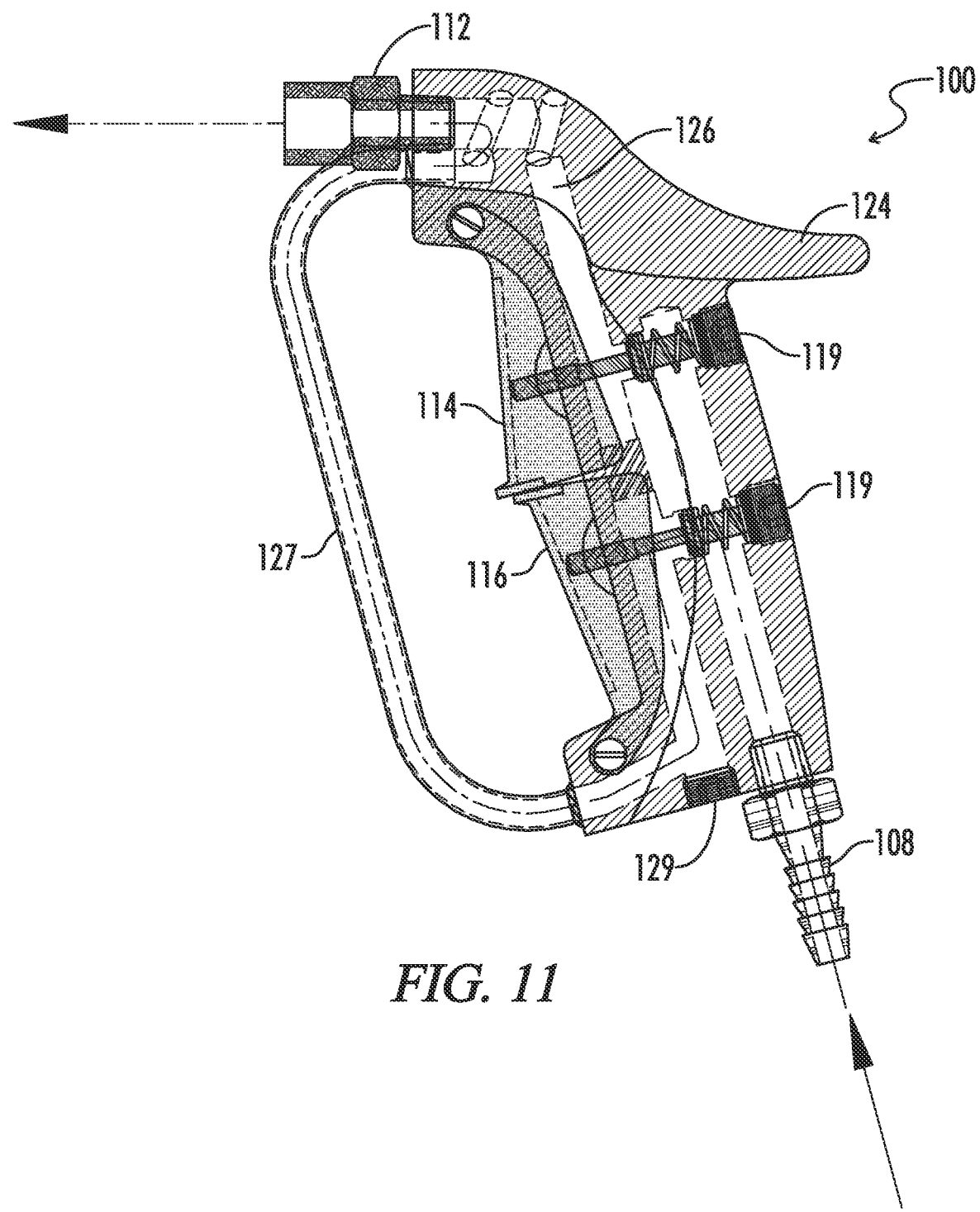
FIG. 11 is a side cross-sectional view of the fluid spray apparatus of FIG. 1 with the bottom actuator actuated.
Figure 13:
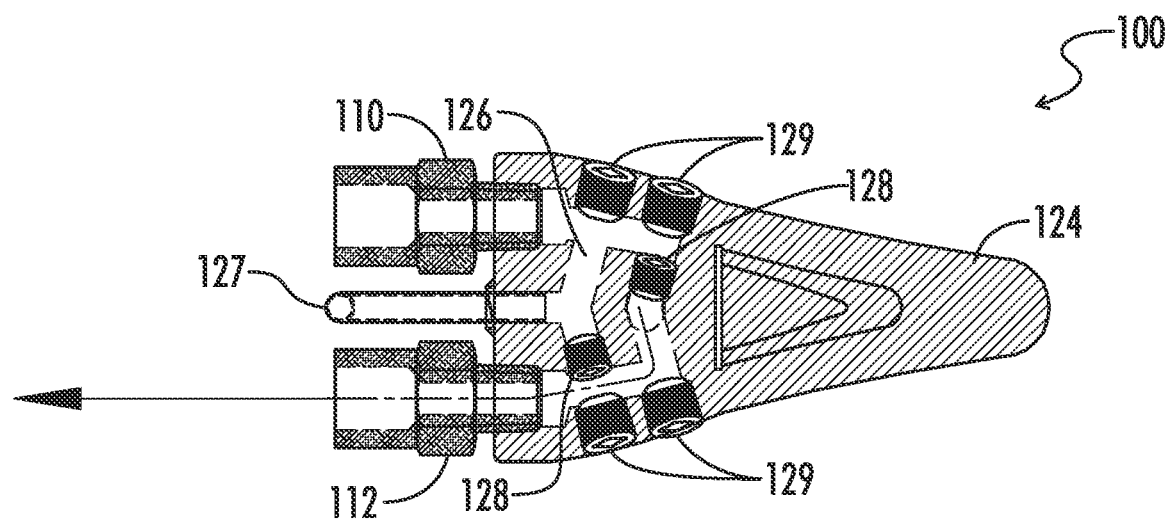
FIG. 13 is a top cross-sectional view of the fluid spray apparatus of FIG. 1 with the diverter structure in a second arrangement and the top actuator actuated.
Figure 14:
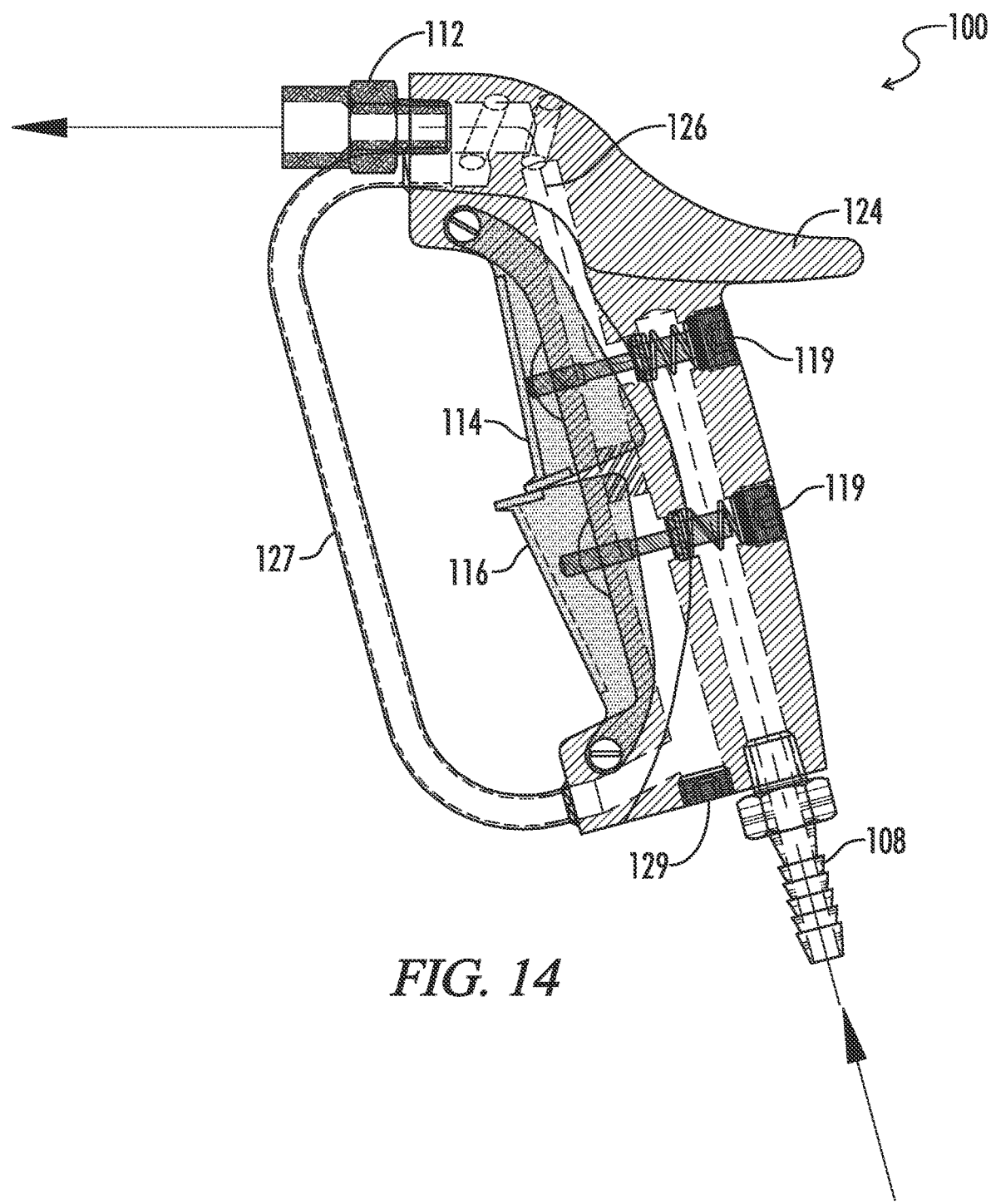
FIG. 14 is a side cross-sectional view of the fluid spray apparatus of FIG. 1 with the top actuator actuated.

As shown in FIGS. 10 and 13, the plurality of plugs 128 may be placed in a second diverter structure arrangement wherein the first actuator 114 may communicate the inlet 102 with the second outlet 106 and the second actuator 116 may communicate the inlet with the first outlet 104. In some embodiments, the first actuator 114 may communicate the opening of the hose attachment barb 108 with the opening of the second nozzle 112 and the second actuator 116 may communicate the opening of the hose attachment barb with the opening of the first nozzle 110.

In some embodiments of the fluid spray apparatus 100, the diverter structure may include a selector valve 130. As can best be seen in FIG. 17, the selector valve 130 may include a plurality of pathways 132 to direct fluid flow. The selector valve 130 may also include one or more sealing portions, or O-rings, 134 to aid in directing fluid flow. In some embodiments, the selector valve 130 may also include a user control portion 136. The user control portion 136 may include, but is not limited to, a hex head, a lever, a button, and the like. In some embodiments of the fluid spray apparatus 100, the selector valve 130 may be configured to be rotated to a first position, or first diverter structure arrangement, and to a second position, or second diverter structure arrangement, by a user.

Figure 18:
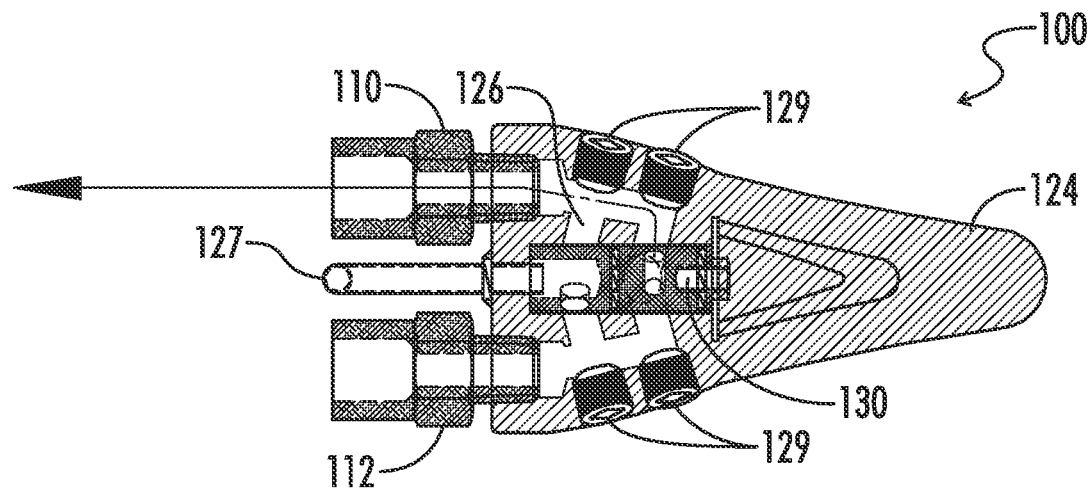
FIG. 18 is a top cross-sectional view of the fluid spray apparatus of FIG. 15 with the diverter structure in a first arrangement and the top actuator actuated.
Figure 21:
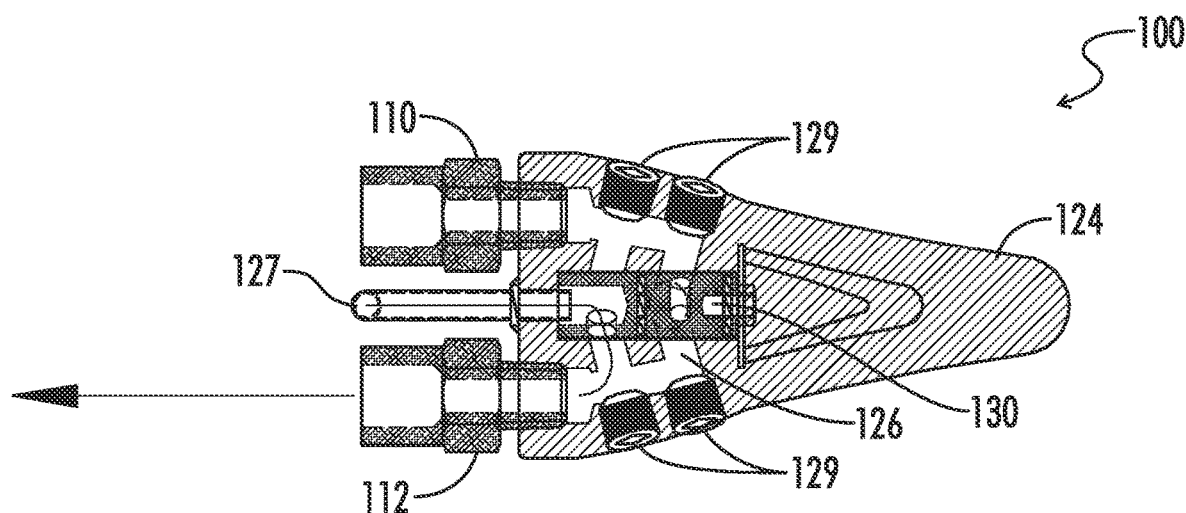
FIG. 21 is a top cross-sectional view of the fluid spray apparatus of FIG. 15 with the diverter structure in a first arrangement and the bottom actuator actuated.

As shown in FIGS. 18 and 21, the selector valve 130 may be placed in a first position, or first diverter structure arrangement, wherein the first actuator 114 may communicate the inlet 102 with the first outlet 104 and the second actuator 116 may communicate the inlet with the second outlet 106. In some embodiments, the selector valve 130 may be placed in the first position and the first actuator 114 may communicate the opening of the hose attachment barb 108 with the opening of the first nozzle 110 and the second actuator 116 may communicate the opening of the hose attachment barb with the opening of the second nozzle 112.

Figure 19:
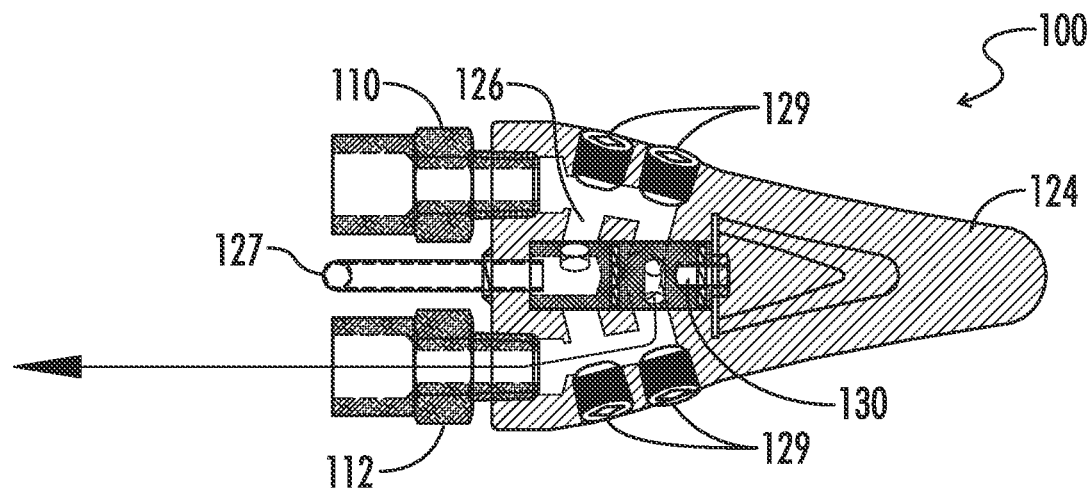
FIG. 19 is a top cross-sectional view of the fluid spray apparatus of FIG. 15 with the diverter structure in a second arrangement and the top actuator actuated.
Figure 20:
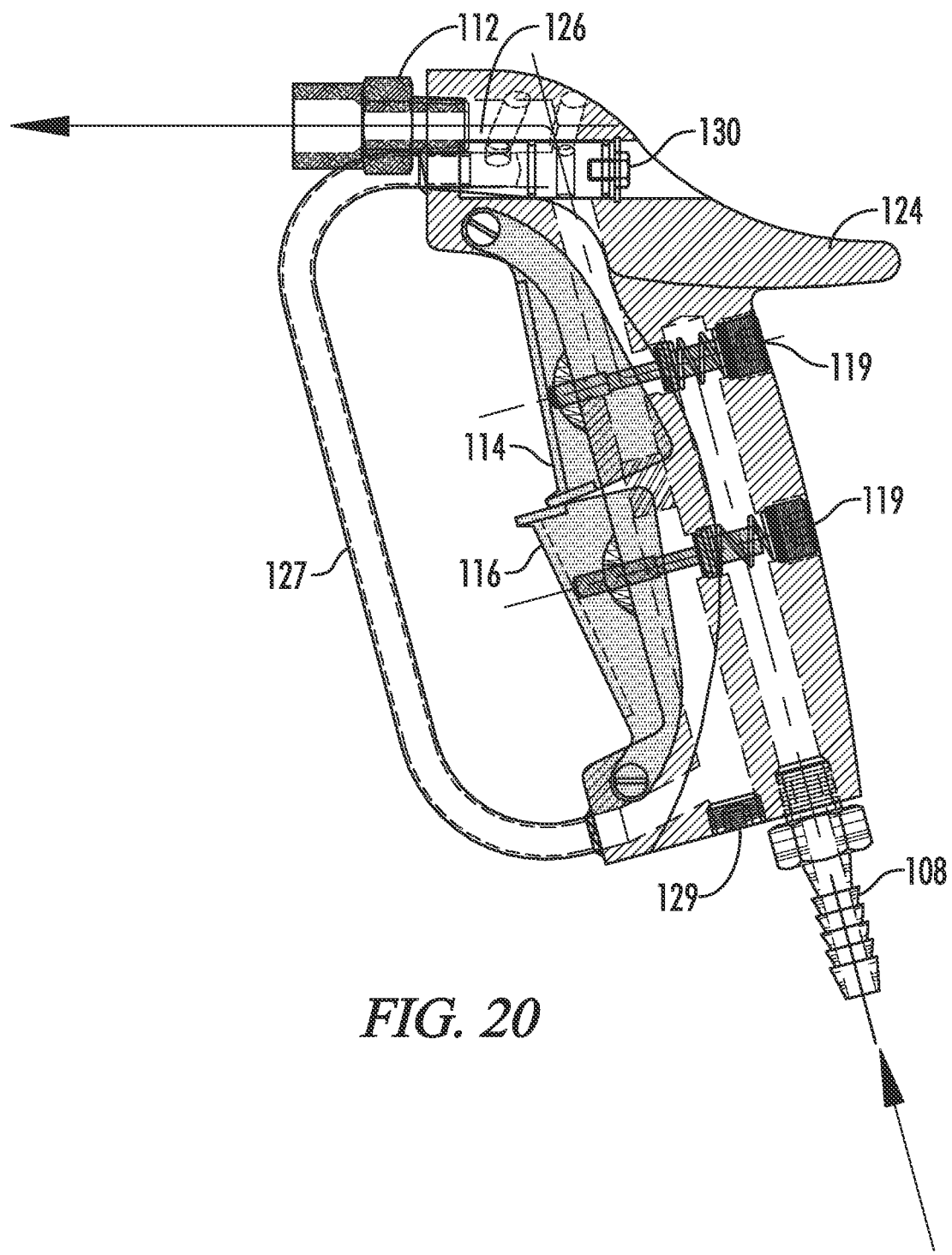
FIG. 20 is a side cross-sectional view of the fluid spray apparatus of FIG. 15 with the top actuator actuated.
Figure 22:
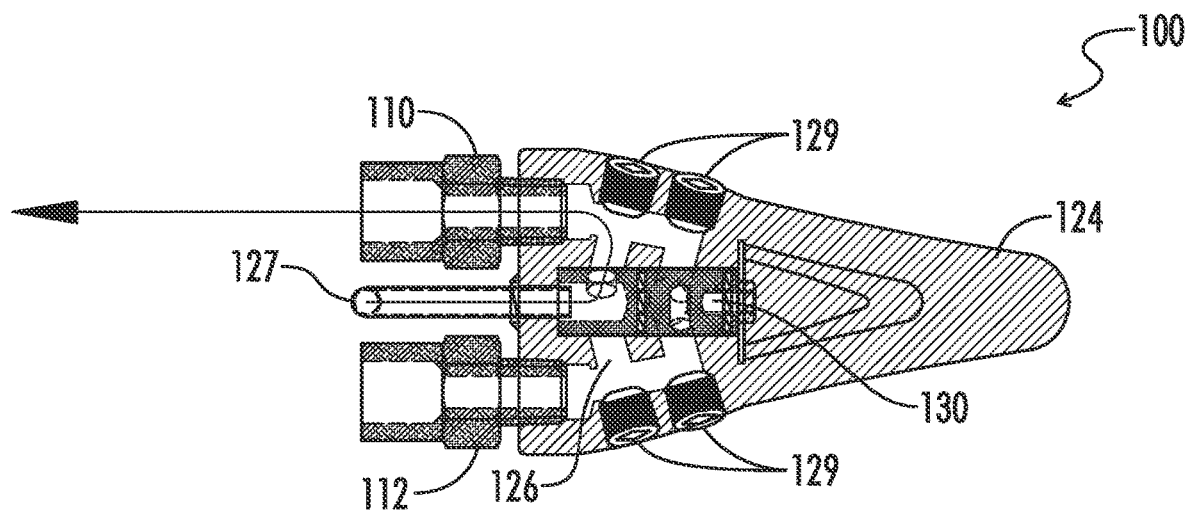
FIG. 22 is a top cross-sectional view of the fluid spray apparatus of FIG. 15 with the diverter structure in a second arrangement and the bottom actuator actuated.
Figure 23:
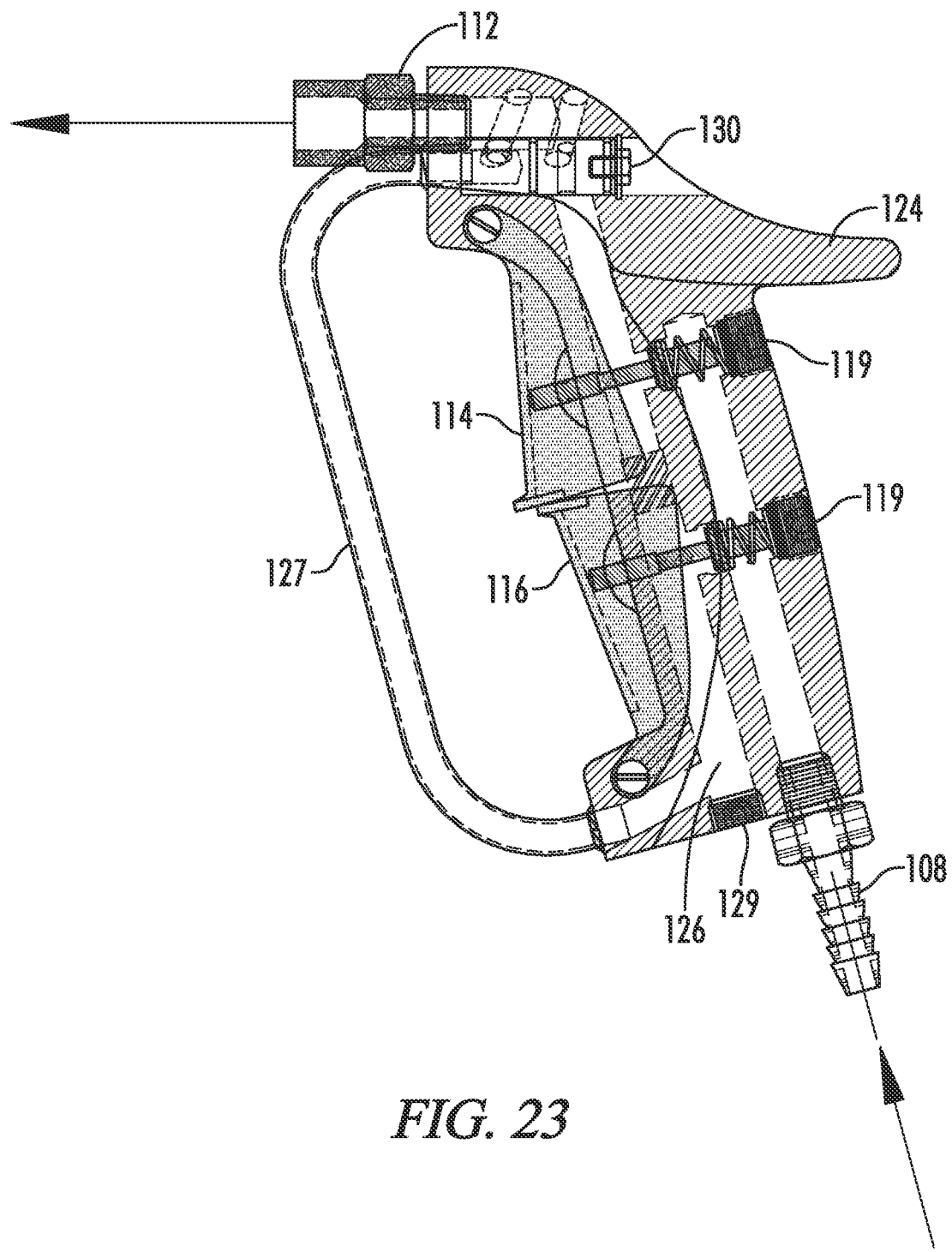
FIG. 23 is a side cross-sectional view of the fluid spray apparatus of FIG. 15 with the bottom actuator actuated.

As shown in FIGS. 19 and 22, the selector valve 130 may be placed in a second position, or second diverter structure arrangement, wherein the first actuator 114 may communicate the inlet 102 with the second outlet 106 and the second actuator 116 may communicate the inlet with the first outlet 104. In some embodiments, the selector valve 130 may be placed in the second position and the first actuator 114 may communicate the opening of the hose attachment barb 108 with the opening of the second nozzle 112 and the second actuator 116 may communicate the opening of the hose attachment barb with the opening of the first nozzle 110.

The current disclosure also relates to a method of operating the fluid spray apparatus 100 including the fluid inlet 102 and first and second fluid outlets 104, 106. The method may include placing a diverter structure, including, but not limited to, the plurality of plugs 128 or the selector valve 130, in a first arrangement. With the diverter structure in the first arrangement, the user may actuate the first actuator, or first trigger, 114 to flow fluid from the inlet 102 to the first outlet 104. With the diverter structure in the first arrangement, the user may also actuate the second actuator, or second trigger, 116 to flow fluid from the inlet 102 to the second outlet 106. The user may place the diverter structure in a second arrangement. With the diverter structure in the second arrangement, the user may actuate the first actuator 114 to flow fluid from the inlet 102 to the second outlet 106. With the diverter structure in the second arrangement, the user may also actuate the second actuator 116 to flow fluid from the inlet 102 to the first outlet 104.

In one embodiment, the method of operating the fluid spray apparatus 100 may include removably placing the plurality of plugs 128 in the first arrangement to block a portion of the passage network 126 and placing the plurality of plugs in the second arrangement to block a different portion of the passage network.

In another embodiment, the method of operating the fluid spray apparatus 100 may include placing the selector valve 130 in a first position such that the diverter structure is in the first arrangement and a second position such that the diverter structure is in the second arrangement.

Figure 24:
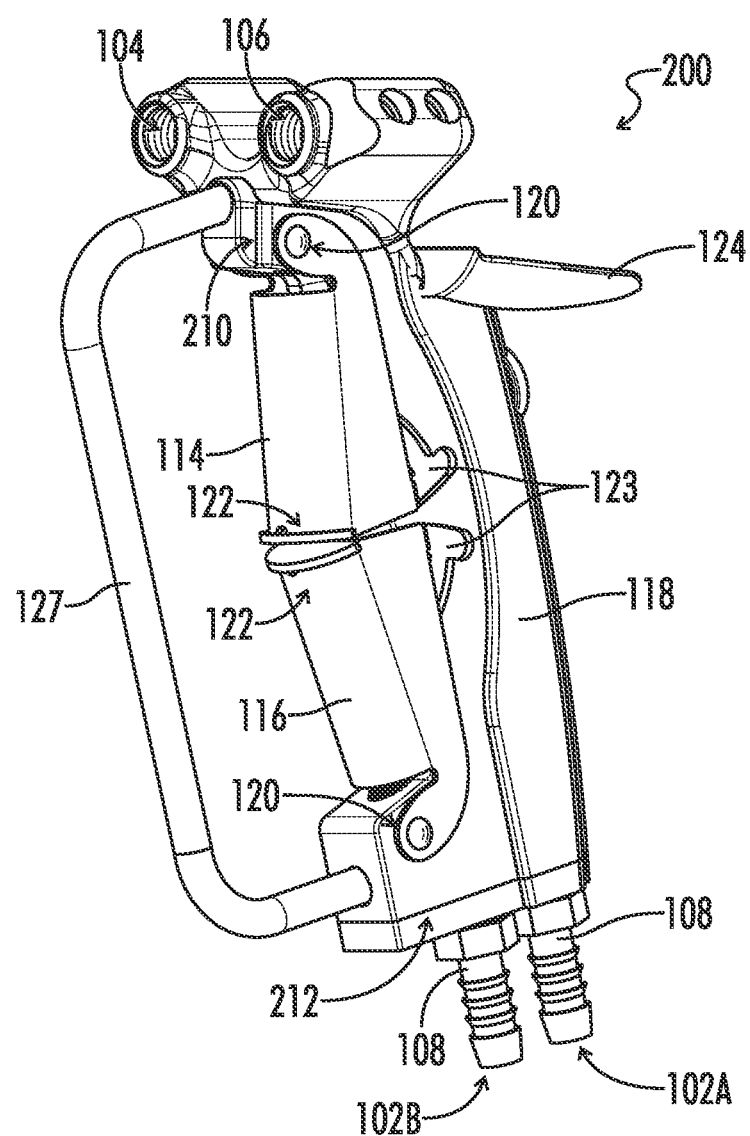
FIG. 24 is a perspective view of another embodiment of the fluid spray apparatus.
Figure 25:
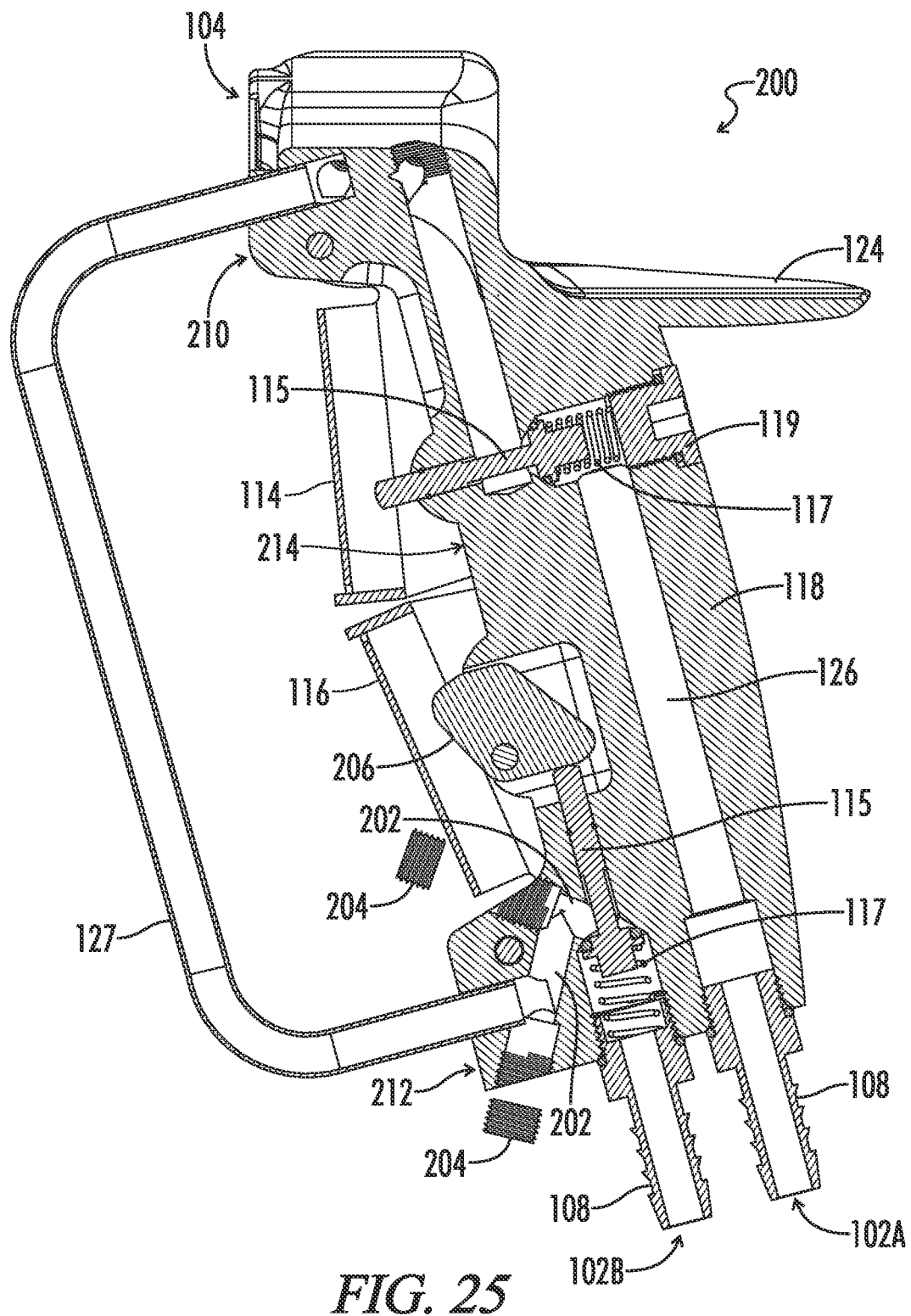
FIG. 25 is a side cross-sectional of the fluid spray apparatus of FIG. 24.

Referring to FIGS. 24 and 25, an embodiment of a fluid spray apparatus 200 is illustrated. The fluid spray apparatus 200 shares many common elements and/or features with the fluid spray apparatus 100. Accordingly, similar elements of the fluid spray apparatus 200 will be numbered similarly to those of the fluid spray apparatus 100.

The fluid spray apparatus 200 includes a first inlet 102A, a second inlet 102B, a first outlet 104, a second outlet 106, a first actuator 114, and a second actuator 116. The first actuator 114 may be configured to communicate the first inlet 102A with one of the first or second outlets 104, 106. The second actuator 116 may be configured to communicate the second inlet 102B with a different one of the first or second outlets 104, 106. In certain optional embodiments, the fluid spray apparatus 200 includes at least one inlet, which may include the first inlet 102A and the second inlet 102B. A hose attachment barb 108 may be associated with each of the first and second inlets 102A, 102B.

The passageway network 126 of the fluid spray apparatus 200 may include the tube 127. In accordance therewith, the second actuator 116 may be coupled to the different one of the first or second outlets 104, 106 using the tube 127, which may be positioned forward of the first and second actuators 114, 116. For example, the first and second actuators 114, 116 may be positioned between the handle 118 and the tube 127. The tube 127 may extend between a proximal end 210 of the handle 118 and a distal end 212 of the handle 118.

The first and second actuators 114, 116 may at least partially surround an exterior front side 214 of the handle 118. The tube 127 may extend from the front side 214 such that the front side 214 faces the tube 127. The first actuator 114 may be coupled to the handle 118 closer to the first and second outlets 104, 106 that to the first and second inlets 102A, 102B. The second actuator 116 may be coupled to the handle 118 closer to the first and second inlets 102A, 102B than to the first and second outlets 104, 106.

As illustrated in FIG. 25, the valve 115 associated with the second actuator 116 may be repositioned vertically, as compared with the fluid spray apparatus 100. The spring 117 may be sandwiched between the valve 115 and the hose attachment barb 108. The second inlet 102B may be coupled to the tube 127 using at least one passageway 202. The at least one passageway 202 may include a plug 204 configured to threadedly engage a portion of the at least one passageway 202. The plug 204 may be optional in other embodiments, wherein the passageway 202 is cast during manufacturing. The valve 115 may be actuated by the second actuator 116 using a pivotal member 206 coupled to the handle 118.

Figure 26:
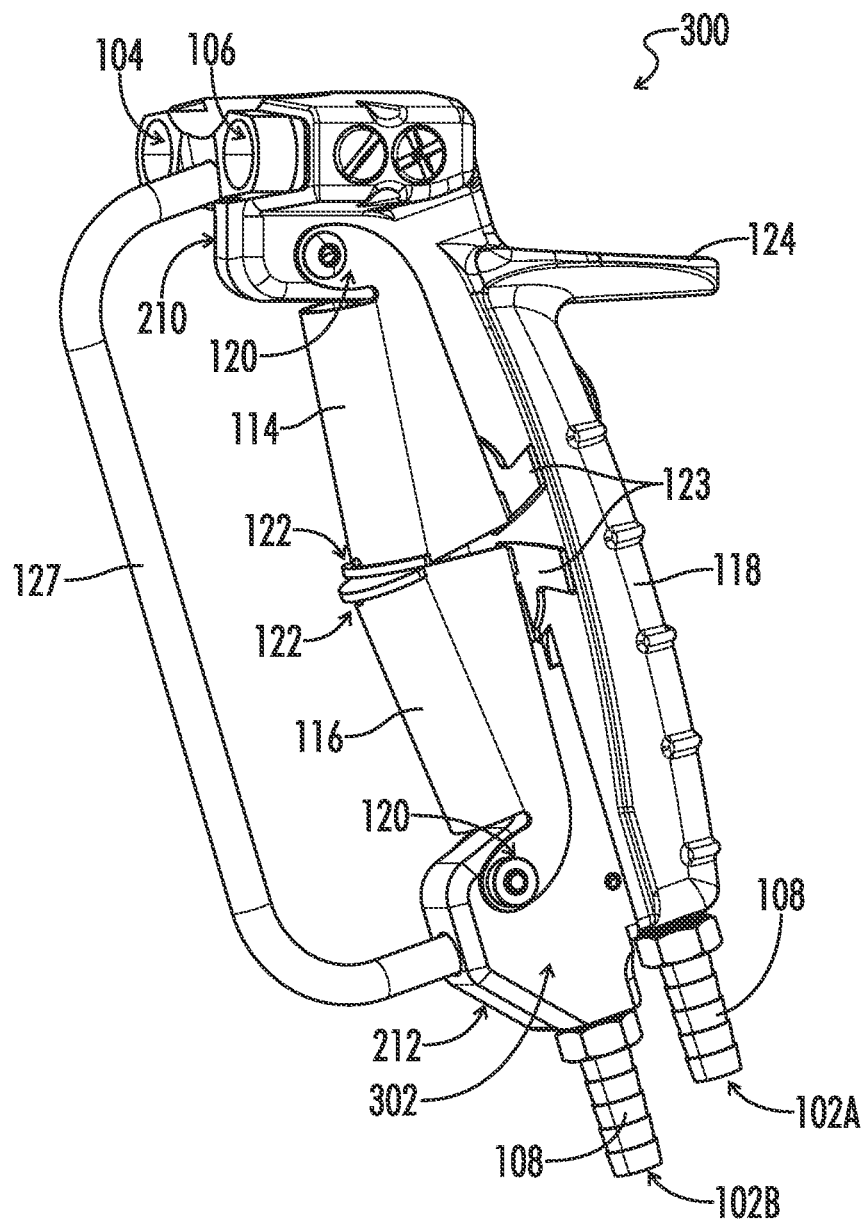
FIG. 26 is a perspective view of yet another embodiment of the fluid spray apparatus.
Figure 27:
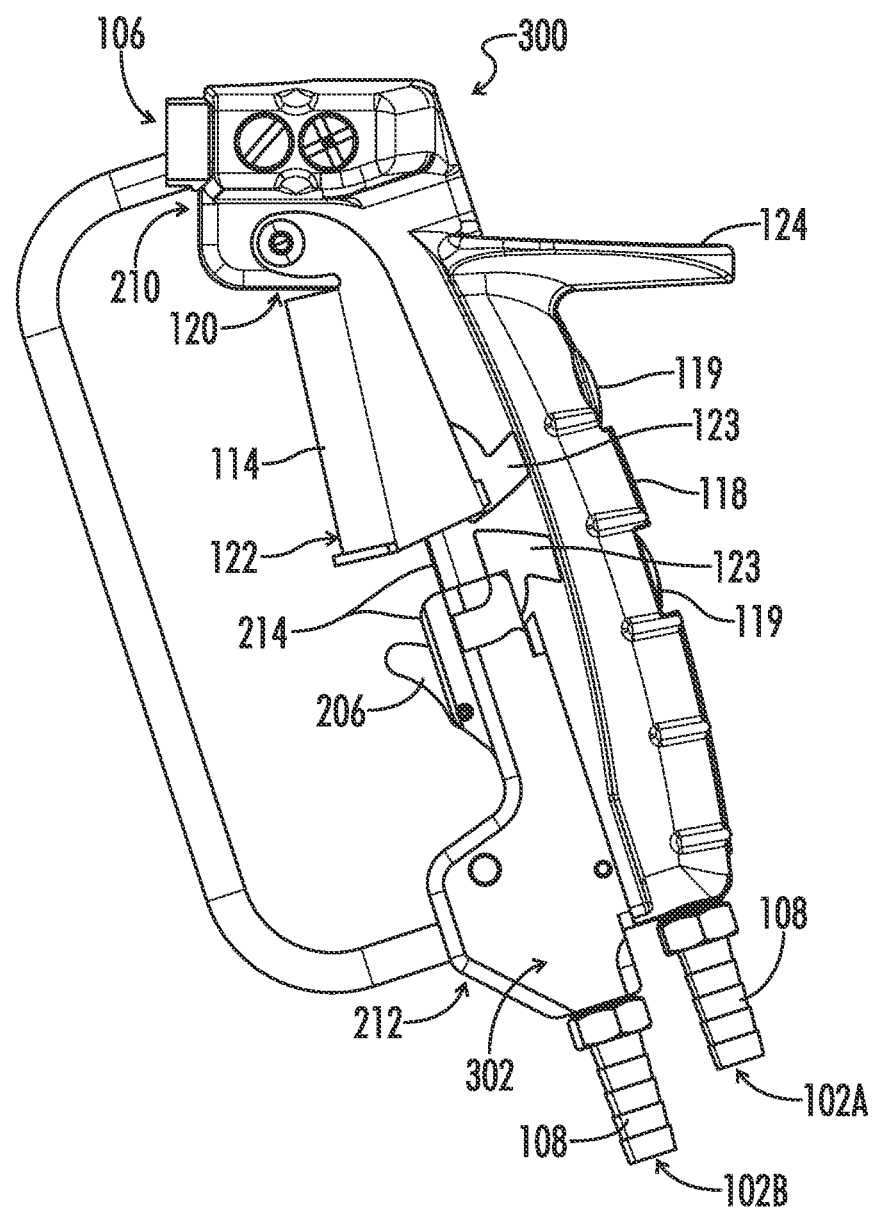
FIG. 27 is a side view of the fluid spray apparatus of FIG. 26 with the second actuator removed.
Figure 28:
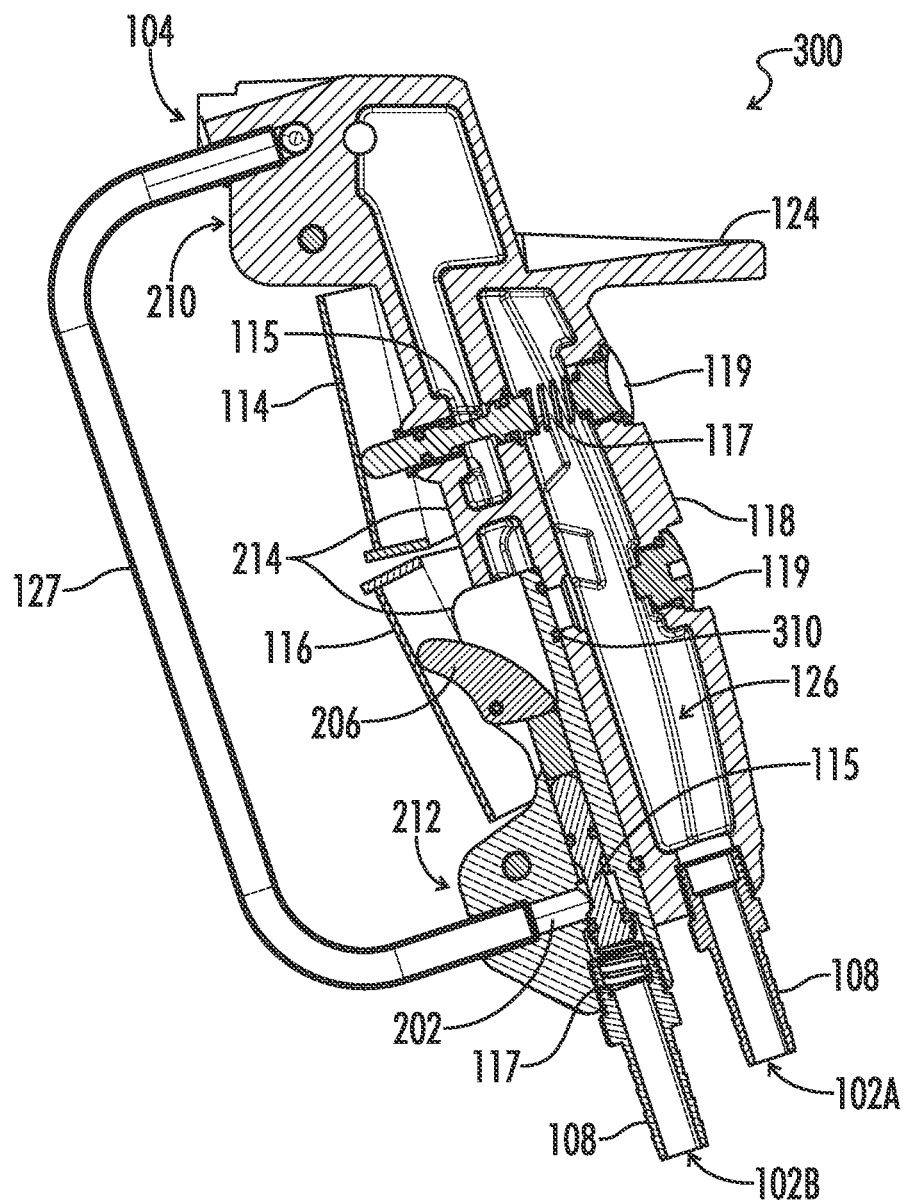
FIG. 28 is a side cross-sectional of the fluid spray apparatus of FIG. 26.

Referring to FIGS. 26-28, another embodiment of a fluid spray apparatus 300 is illustrated. The fluid spray apparatus 200 represents an integral version having first and second inlets 102A, 102B integrally formed in the handle 118. The fluid spray apparatus 300 represents a retrofit version of the fluid spray apparatus 100 having first and second inlets 102A, 102B, however, the second inlet 102B is incorporated into the handle 118 via an attachment, as discussed below. The fluid spray apparatus 300 shares many common elements and/or features with the fluid spray apparatus 100 and the fluid spray apparatus 200. Accordingly, similar elements of the fluid spray apparatus 300 will be numbered similarly to those of the fluid spray apparatus 100 and the fluid spray apparatus 200.

Figure 29:
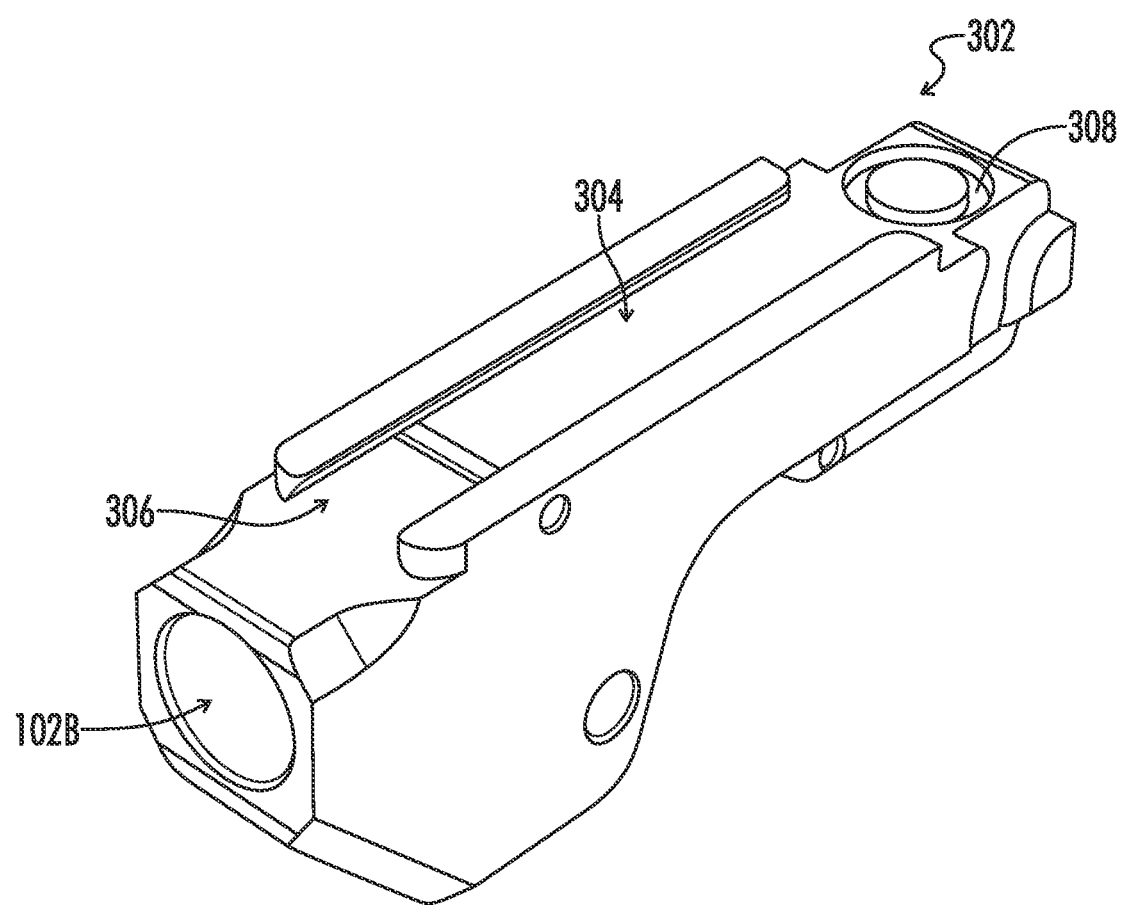
FIG. 29 is a rear perspective view of the retrofit portion of the fluid spray apparatus of FIG. 26.

The fluid spray apparatus 300 may include a retrofit portion 302 that may be attached to the handle 118. A section of the handle 118 of the fluid spray apparatus 100, which is associated with placement of the retrofit portion 302, may be machined to remove said section so that the retrofit portion 302 may be attached to the handle 118. As illustrated in FIG. 29, a rear portion 304 of the retrofit portion 302 may include a channel 306 configured to engage with a rail of the fluid spray apparatus 300. The rail may be defined during the machining process. The rear portion 304 may further include an o-ring receptacle 308 configured to receive an o-ring 310 for sealing a portion of the passageway network 126 associated with the first actuator 114.

The fluid spray apparatus 300 may include a passageway 202 and a pivotal member 206 similar to the fluid spray apparatus 200. Each of the passageway 202, the pivotal member 206, the valve 115 and the spring 117 may be housed within the retrofit portion 302. The second actuator 116 may be couplable to the retrofit portion 302 just as it was to the original handle 118. Additionally, the retrofit portion 302 may define the distal end 212 of the handle 118. The tube 127 may be coupled between the passageway 202 of the retrofit portion 302 and the proximal end 210 of the handle 118.

Accordingly, the fluid spray apparatuses 200, 300 advantageously provides a user with a single hand operated fluid spray apparatus that has the ability to spray two different liquids with the same or different patterns.

While the present disclosure has been described with particularity in relation to spraying herbicide, the present disclosure may also apply to any fluid spray apparatus used for any purpose including, but not limited to, distributing paint, detergents, pesticides, disinfectants, and the like.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A fluid spray apparatus comprising:
a body;
a first inlet external to the body;
a second inlet external to the body;
a first outlet;
a second outlet;
a first actuator configured to communicate the first inlet with one of the first or second outlets;
a second actuator configured to communicate the second inlet with a different one of the first or second outlets;
a passage network positioned within the body and communicating the first and second actuators with the first and second outlets; and
a diverter structure disposed in the passage network and including:
 a first diverter structure arrangement wherein the first actuator communicates the first inlet with the first outlet and the second actuator communicates the second inlet with the second outlet; and
 a second diverter structure arrangement wherein the first actuator communicates the first inlet with the second outlet and the second actuator communicates the second inlet with the first outlet.

2. The fluid spray apparatus of claim 1, wherein:
the diverter structure includes a plurality of plugs removably disposed in one of a plurality of positions blocking a portion of the passage network.

3. The fluid spray apparatus of claim 1, wherein:
the diverter structure includes a selector valve.

4. The fluid spray apparatus of claim 1, wherein:
the first diverter structure arrangement and the second diverter structure arrangement are mutually exclusive.

5. The fluid spray apparatus of claim 1, wherein:
the first outlet and the second outlet are each configured to receive a variety of fluid spray nozzles.

6. The fluid spray apparatus of claim 1, wherein:
the first outlet includes a diffuse spray nozzle and the second outlet includes a solid stream nozzle.

7. The fluid spray apparatus of claim 1, wherein:
at least one of the first outlet and the second outlet includes an adjustable spray nozzle.

8. The fluid spray apparatus of claim 1, wherein:
the second actuator is coupled to the different one of the first or second outlets using an exterior tube positioned forward of the first and second actuators.

9. The fluid spray apparatus of claim 1, further comprising:
a handle; and
the first and second actuators hingedly and opposingly disposed on the handle.

10. The fluid spray apparatus of claim 9, wherein:
the first and second actuators at least partially surround a front side of the handle.

11. The fluid spray apparatus of claim 9, wherein:
the first actuator is hingedly coupled to the handle closer to the first and second outlets than to the first and second inlets; and
the second actuator is hingedly coupled to the handle closer to the first and second inlets than to the first and second outlets.

12. The fluid spray apparatus of claim 1, further comprising:
a handle; and
the first and second actuators are coupled to and at least partially surround an exterior of the handle.

13. A fluid spray apparatus comprising:
at least one inlet;
a first outlet;
a second outlet;
a first actuator configured to communicate the at least one inlet with one of the first or second outlets;
a second actuator configured to communicate the at least one inlet with a different one of the first or second outlets;
a passage network communicating the first and second actuators with the first and second outlets; and
a diverter structure disposed in the passage network and including:
 a first diverter structure arrangement wherein the first actuator communicates the at least one inlet with the first outlet and the second actuator communicates the at least one inlet with the second outlet; and
 a second diverter structure arrangement wherein the first actuator communicates the at least one inlet with the second outlet and the second actuator communicates the at least one inlet with the first outlet.

14. The fluid spray apparatus of claim 13, wherein:
the at least one inlet includes a first inlet and a second inlet.

15. The fluid spray apparatus of claim 13, wherein:
the second actuator is coupled to the different one of the first or second outlets using an exterior tube positioned forward of the first and second actuators.

16. The fluid spray apparatus of claim 13, further comprising:
a handle; and
the first and second actuators are hingedly coupled to and at least partially surround an exterior front side of the handle.

17. The fluid spray apparatus of claim 16, further comprising:
an exterior tube configured to couple the at least one inlet to one of the first or second outlets using the second actuator; and
the exterior tube extends from a same side of the handle as the first and second actuators.

18. The fluid spray apparatus of claim 13, wherein:
the first actuator includes a first trigger and the second actuator includes a second trigger; and
the first and second triggers are configured to be aligned with each other and opposed to each other.

19. The fluid spray apparatus of claim 13, wherein:
each of the first and second actuators is further configured to prevent communication between the at least one inlet and the first and second outlets when the actuators are unactuated.

* * * * *